United States Patent
Ogawa et al.

(10) Patent No.: US 7,393,597 B2
(45) Date of Patent: Jul. 1, 2008

(54) WELDED JOINT MADE OF AN AUSTENITIC STEEL

(75) Inventors: Kazuhiko Ogawa, Nishinomiya (JP); Masaaki Igarashi, Sanda (JP); Hiroyuki Semba, Sanda (JP); Tomohiko Omura, Kishiwada (JP); Mitsuo Miyahara, Kobe (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 174 days.

(21) Appl. No.: 11/297,433

(22) Filed: Dec. 9, 2005

(65) Prior Publication Data

US 2006/0191606 A1    Aug. 31, 2006

Related U.S. Application Data

(63) Continuation of application No. PCT/JP2004/008279, filed on Jun. 8, 2004.

(30) Foreign Application Priority Data

Jun. 10, 2003    (JP) .............................. 2003-165669

(51) Int. Cl.
*B32B 15/00* (2006.01)
*B32B 15/04* (2006.01)
*B32B 15/18* (2006.01)
*B32B 15/20* (2006.01)
*F16L 9/14* (2006.01)
*F16L 9/22* (2006.01)

(52) U.S. Cl. ..................... 428/681; 428/586; 428/682; 428/683; 428/684; 138/142; 138/143; 138/177

(58) Field of Classification Search ................ 428/681, 428/586, 682, 683, 684, 685, 34.1, 457; 148/590; 138/140, 141, 142, 143, 145, 177, 178
See application file for complete search history.

(56) References Cited

U.S. PATENT DOCUMENTS 3,181,970 A    5/1965  Peck
2002/0011287 A1*    1/2002  Nishimoto et al. .......... 148/336

FOREIGN PATENT DOCUMENTS

| JP | 55-100966 | | 8/1980 |
| JP | 05-192785 | | 8/1993 |
| JP | 07-227693 | * | 8/1995 |
| JP | 09-271982 | | 10/1997 |
| JP | 10-088289 | | 4/1998 |
| JP | 10-146692 | | 6/1998 |
| JP | 11-277293 | | 10/1999 |
| JP | 2001-107196 | * | 4/2001 |

* cited by examiner

*Primary Examiner*—Michael La Villa
(74) *Attorney, Agent, or Firm*—Clark & Brody

(57) ABSTRACT

A weld joint having a base material and a weld metal both of an austenitic steel, wherein the weld metal has a chemical composition, in mass %, that C: 0.04% or less, Si: 1.0% or less, Mn: 3% or less, P: 0.02% or less, S: 0.005% or less, Cr: 15 to 25%, Ni: 30% or more, Mo: 10% or less, Nb: 2.5 to 5%, Al: 3.0% or less, Ti: 0.5% or less, and the balance: Fe and inevitable impurities, the contents of Al and Ti satisfying the following: (Ti+Al)>Nb/8. The weld joint is a high strength austenitic steel weld joint which exhibits excellent toughness at a low temperature and excellent resistance to hydrogen embrittlement, which are required for a piping and a vessel for high pressure hydrogen, particularly also in a welded zone.

10 Claims, 1 Drawing Sheet

US 7,393,597 B2

WELDED JOINT MADE OF AN AUSTENITIC STEEL

CROSS-REFERENCE TO RELATED APPLICATIONS

This application is a continuation of International Patent Application No. PCT/JP2004/008279, filed Jun. 8, 2004. This PCT application was not in English as published under PCT Article 21(2).

TECHNICAL FIELD

This invention relates to a component for use in a hydrogen environment, such as a component made of a high strength austenitic steel having excellent weldability, low temperature toughness, and resistance to hydrogen embrittlement which are properties demanded of piping and the like for use in high pressure hydrogen. More specifically, this invention relates to a welded joint of an austenitic steel having a weld metal with excellent low temperature toughness, resistance to hydrogen embrittlement, and strength.

BACKGROUND ART

Today, there is increasing hope for the practical application of fuel cell automobiles. Development of materials is being actively carried out in order to provide materials for use not only in fuel cell automobiles but in high pressure storage vessels, piping, valves, and the like to be used in hydrogen gas stations and the like which are necessary to establish an environment of use for fuel cell automobiles. Such a high pressure environment is said to be 50 MPa or above.

An austenitic stainless steel which has excellent resistance to hydrogen embrittlement is considered suitable for use in a usual hydrogen environment. Accordingly, various attempts are being made at increasing its strength to enable such an austenitic stainless steel to withstand a higher pressure hydrogen environment of 50 MPa or above. For example, it has been proposed to obtain a high strength by increasing the Mn content of the base metal, increasing the solubility of N, adding a relatively large amount of N and V, and carrying out suitable heat treatment.

However, even if it is possible to obtain a high strength base metal, it is difficult to obtain a high strength even with an austenitic weld metal. Since the weld metal undergoes melting and solidification and the weld heat affected zone undergoes heating and cooling at the time of welding, a decrease in strength occurs in welds. Therefore, in the past, strengthening methods were employed to precipitate fine grains by heat treatment after welding.

For example, Japanese Published Unexamined Patent Applications Hei 5-192785 and Hei 10-146692 disclose forming a weld metal from an Ni-base alloy to which Ti and Al have been added and heating it in a prescribed temperature range to precipitate fine intermetallic compounds ($Ni_3Al$, $Ni_3Ti$) referred to as gamma' prime ($\gamma'$) phase, whereby the weld metal can be strengthened. However, these weld metals have the problem that they have a high susceptibility to weld hot cracking and that it is easy for a decrease in toughness to occur due to hardening caused by precipitation of the above-described intermetallic compounds.

Japanese Published Unexamined Patent Application Hei 9-271982 discloses that improving the composition of the coating in a coated electrode for arc welding is effective at preventing weld hot cracking in high-Ni weld metal containing Ti and Nb, but such a method is intended for buildup welding.

DISCLOSURE OF THE INVENTION

Even if a high strength like that described above is realized, it has become clear that in a high pressure hydrogen environment of 50 MPa or above, low temperature embrittlement and hydrogen embrittlement which were not experienced under normal pressures, and particularly low temperature embrittlement and hydrogen embrittlement of the weld metal, become marked.

Not only high strength but also improved resistance to hydrogen embrittlement and low temperature toughness are strongly desired with respect to the base metal and the weld metal which constitute equipment used in a high pressure hydrogen environment.

The object of the present invention is to provide a high strength welded joint of austenitic steel which has excellent low temperature toughness and resistance to hydrogen embrittlement, particularly in the weld metal, these being properties which are demanded of piping, vessels, and the like for high pressure hydrogen used in fuel cell automobiles, hydrogen gas stations, and the like.

When designing a material for use in apparatuses and equipment including a welded joint, it is necessary to take into consideration both the base metal and the weld metal. In the present invention, a solution to the problems in weld metal where deterioration in material properties is particularly observed was searched for.

The present inventors found that an effective method of guaranteeing the strength of a weld metal is to add Al, Ti, and Nb to a base in the form of a high-Ni alloy and to carry out suitable heat treatment after welding to achieve strengthening by fine precipitation and dispersion of $Ni_3(Al, Ti, Nb)$. However, in order to guarantee toughness and resistance to hydrogen embrittlement in a high strength weld metal having a tensile strength of at least 800 MPa, it is necessary to select a combination of components which alleviate segregation of strengthening elements during solidification. In the present invention, 2.5-5% of Nb is included, and at least one of Al and Ti is included in the range of at most 3% Al and at most 0.5% Ti and so as to satisfy $(Ti+Al) > Nb/8$.

As described above, when strengthening is carried out by addition of only Ti and Al, Ti and Al are concentrated in the final solidified portion by segregation during solidification. As a result, uniform fine dispersion of $Ni_3Al$ and $Ni_3Ti$ is not obtained even with aging treatment, and in portions where Ti and Al are concentrated, $Ni_3Al$ and $Ni_3Ti$ preferentially grow and coarsen. Not only is a high strength not necessarily obtained, but this leads to a deterioration in toughness and resistance to hydrogen embrittlement.

When precipitation strengthening by Nb alone is attempted, as a result of concentration of Nb in the final solidified portion, strength, toughness, and resistance to hydrogen embrittlement are inadequate.

According to the present invention, at least a prescribed amount of Al and/or Ti is incorporated in a weld metal together with a major amount of Nb.

Ti, Al, and Nb easily segregate during solidification, and this leads to a decrease in toughness and resistance to hydrogen embrittlement. However, if Ti and/or Al is added in an amount determined by the amount of Nb, in the later stages of solidification, new nuclei for solidification are formed from the liquid phase and new solid phases develop around the nuclei. As a result, the final solidified portion is divided into small ones. Therefore, the final solidified phase turns into not a large single phase but many finely dispersed phases, and at the time of aging heat treatment, fine $Ni_3(Al, Ti, Nb)$ is finely dispersed. Thus, the resulting weld metal has a high strength, and toughness and resistance to hydrogen embrittlement are also improved.

In a high-Ni alloy which obtains a high strength acheived by the above-described precipitation strengthening, the remains of a continuous liquid phase caused by segregation during solidification, which is the main cause of weld hot cracking, are broken off by dispersion of the final solidified portion, and prevention of weld hot cracking is also achieved.

The present invention is as follows.

(1) A welded joint of austenitic steel comprising a base metal of an austenitic steel and a weld metal, characterized in that the weld metal comprises, in mass percent, C: at most 0.04%, Si: at most 1.0%, Mn: at most 3%, P: at most 0.02%, S: at most 0.005%, Cr: 15.0-25.0%, Ni: at least 30%, Mo: at most 10% and/or W: at most 10%, Nb: 2.5-5%, at most 3.0% of Al and/or at most 0.5% of Ti satisfying the equation (Ti+Al)>Nb/8, and a remainder of Fe and impurities.

(2) A welded joint of austenitic steel as described in (1) wherein the base metal of austenitic steel comprises, in mass percent, C: at most 0.04%, Si: at most 1.0%, Mn: 3-30%, P: at most 0.02%, S: at most 0.005%, Cr: 15-30%, Ni: 5-30%, N: 0.10-0.50%, at least one of Mo: at most 10%, W: at most 10%, V: 0.001-1.0%, Al: at most 0.10%, Ti: at most 0.01%, Zr: at most 0.01%, and Hf: at most 0.01%, and a remainder of Fe and impurities.

A welded joint according to this invention does not exhibit hydrogen embrittlement, and it does not exhibit deterioration in corrosion resistance even in a high pressure hydrogen environment of 50 MPa or above, so it can be used in equipment used in fuel cell automobiles or hydrogen gas stations such as vessels, piping, and valves for high pressure hydrogen.

FORMS FOR CARRYING OUT THE INVENTION

Figure 1:
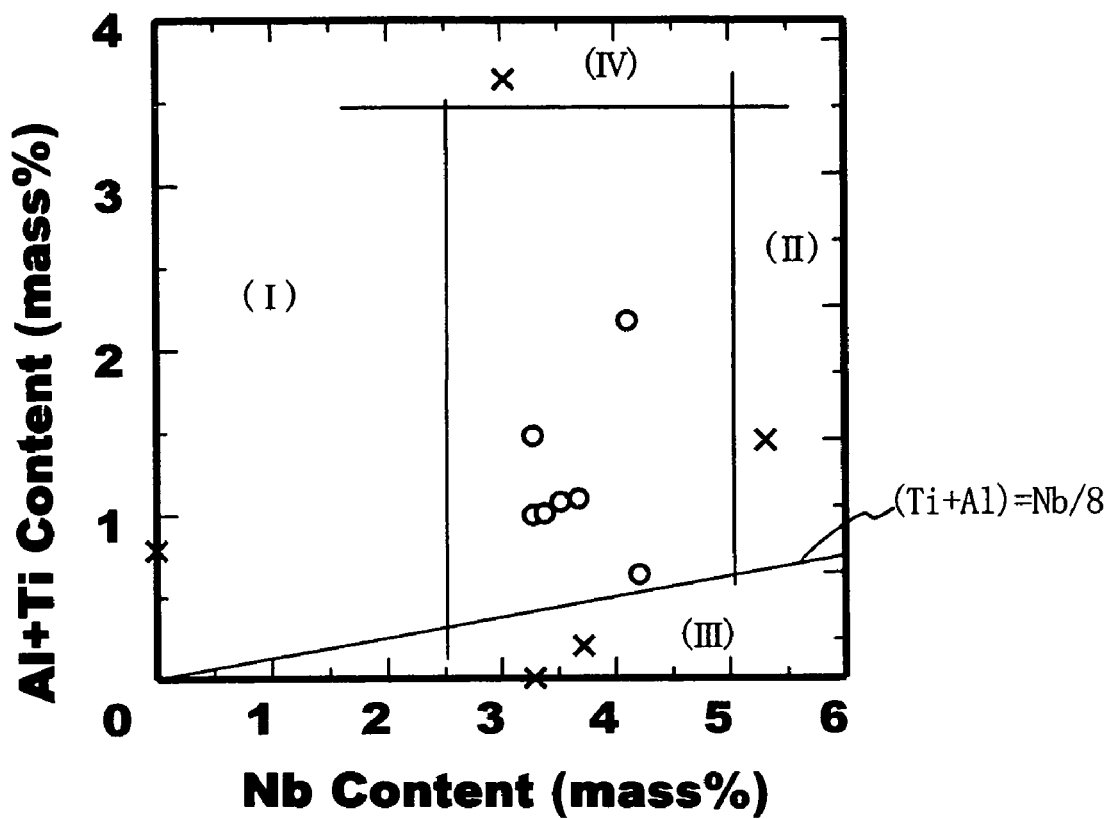
FIG. 1 is a graph compiling the results of examples.

The reasons why the steel composition of a weld metal and a base metal in a welded joint according to the present invention are limited in the above manner will be described in detail.

In this specification, unless otherwise specified, percent with respect to steel composition means mass percent.

This invention is characterized by a welded joint having a weld metal in which a fine gamma' prime ($\gamma'$) phase is dispersed. The reasons why the steel composition of the weld metal at this time is prescribed in the above manner are as follows.

C:

C is effective at increasing strength, but it forms carbides, so if it exceeds 0.04%, decreases in the ductility and toughness of the alloy become large, and the C is defined as at most 0.04%. Preferably it is at most 0.03%. More preferably it is at most 0.02%.

Si:

Si is necessary as a deoxidizing element, but in a weld metal, it forms intermetallic compounds and produces a deterioration in toughness. The lower its level the better, and its upper limit is defined as 1.0%. Preferably the content of Si is at most 0.50% and more preferably it is at most 0.20%.

Mn:

Mn is an element which is effective as a deoxidizing element, but from the standpoint of toughness, the lower its level the better, and the upper limit on its content is defined as 3%. Preferably it is at most 1%.

P:

If a large amount of P is contained in steel, there is the possibility of toughness deteriorating. The P content is limited to at most 0.02%.

S:

S is an extremely harmful element which segregates at grain boundaries and weakens the bonding force of crystal grains and worsens weldability. Therefore, it is important to prescribe its upper limit. The upper limit of S is 0.005%.

Cr:

Cr is an element which is necessary for improving corrosion resistance in a high pressure gas environment. From the standpoint of this effect, its lower limit is restricted to 15.0%. However, if it is contained in excess, it impairs mechanical properties in the form of toughness and workability. Its upper limit is defined as 25.0%. Preferably the Cr content is 17-22%.

Ni:

Ni not only stabilizes an austenite phase as a constituent element of the matrix, but it is also important for finely dispersing gamma' prime ($\gamma'$) phase ($Ni_3$(Ti, Al, Nb) intermetallic compounds). The effect of finely precipitating gamma' prime ($\gamma'$) phase is obtained when Ni is at least 30%. Preferably it is at least 40% and at most 80%.

Ni is an indispensable element for obtaining a stable austenite structure and for guaranteeing resistance to carburization. The amount thereof is preferably as large as possible, particularly to increase the effect of precipitation strengthening by a gamma' prime ($\gamma'$) phase.

Mo, W:

Mo and W are effective mainly as solid solution strengthening elements. Strength can be increased by suitably including at least one thereof to strengthen the austenite phase matrix. If they are included in excess, intermetallic compounds cause a decrease in toughness precipitate. The Mo content is made at most 10% and W is made at most 10%.

There are no particular limits on N, but normally it is contained in an amount of at most 0.1%.

Nb:

When Nb is added together with Al and/or Ti, a $\gamma'$ phase (a $Ni_3$(Ti, Al, Nb) intermetallic compound) is formed and a precipitation strengthening effect can be expected. In addition, if Nb is present in the weld metal together with Al and/or Ti, in the later stages of solidification, it forms separate solidification nuclei from the liquid phase, and separate solid phases grow around the nuclei, so the final solidified portion is dispersed. As a result, the final solidified portion itself is not a large single phase but becomes many finely dispersed phases, so at the time of aging heat treatment, a fine $\gamma'$ phase is uniformly dispersed, and even though a high strength is obtained, toughness and resistance to hydrogen embrittlement can be maintained. In order to form these fine nuclei, at least 2.5% of Nb is added. However, if it is added in excess, it leads to formation of coarse intermetallic compounds, and it worsens toughness and resistance to hydrogen 10 embrittlement, so it is made at most 5.0%. Preferably, it is 3-4.5%.

Al and/or Ti, (Ti+Al)>Nb/8:

At least one of Al and Ti can be added, but preferably Al and Ti are both added.

Excessive addition of Al leads to the formation of coarse intermetallic compounds and deteriorates toughness and resistance to hydrogen embrittlement.

The upper limit for Al therefor is restricted to 3.0%.

Excessive addition of Ti leads to formation of coarse intermetallic compounds and worsens toughness and resistance to hydrogen embrittlement, so it is made at most 0.5%.

As a result of addition of Al and/or Ti together with Nb, not only can a precipitation strengthening effect be expected due to formation of a fine γ' phase ($Ni_3$(Ti, Al, Nb) intermetallic compounds), but if they are present together with Nb, in the later stages of solidification of the weld metal, separate solidification nuclei are formed from the liquid phase, and separate solid phases grow around the nuclei. As a result, the final solidified portion is dispersed. Accordingly, the final solidified portion itself is not a large single phase but becomes many finely dispersed phases, fine gamma' (γ') phases are uniformly dispersed at the time of aging heat treatment, and toughness and resistance to hydrogen embrittlement can be maintained while obtaining a high strength.

In order to form such fine solidification nuclei, it is important to satisfy the condition (Ti+Al)>Nb/8.

FIG. 1 is a graph showing the influence of the (Ti, Al) content and the Nb content on material properties. It is a graph showing the effect of each of the above-described alloying elements. The results of the below-described examples are plotted by open circles and X marks.

In the figure, region (I) is a region of low strength due to the Nb content being small and precipitation strengthening being inadequate. Region (II) is a region in which the Nb content exceeds 5%, and in Region (II) coarse intermetallic compounds are formed and toughness is inadequate. Region (III) is a region in which the relationship (Ti+Al)>Nb/8 is not satisfied and solidification precipitation of Nb is observed. In Region (III) a decrease in toughness and hydrogen embrittlement are marked. Region (IV) is a region in which the content of (Ti, Al) is too large, solidification segregation of Nb is unavoidable, and a decrease in toughness and hydrogen embrittlement are observed.

Thus, Ti, Al, Nb are effective for improving the strength of a weld metal, but if they are excessively added, they easily segregate when the weld metal solidifies, and solidification segregation easily occurs. If solidification segregation develops, it leads to a decrease in toughness and resistance to hydrogen embrittlement. Therefore, in the present invention, by specifying the contents of Ti, Al, and Nb so as to satisfy (Ti+Al)>Nb/8, separate solidification nuclei are formed from the liquid phase in the later stages of solidification, and solid phases grow around the nuclei, so Nb is finely dispersed, and solidification segregation is suppressed.

If Ti, Al, and Nb are added in the range shown in FIG. 1, the final solidified portion is not a large single phase but is many finely dispersed phases, and as a result, at the time of heat treatment after welding, fine $Ni_3$(Al, Ti, Nb) is uniformly dispersed. Accordingly, not only is a high strength weld metal obtained, but a weld metal is obtained having excellent toughness and resistance to hydrogen embrittlement.

In a weld metal forming a welded joint according to the present invention, the reminder is Fe and unavoidable impurities. Examples of impurities at this time are Cu, Co, and elements such as V, Zr, and Hf which are mixed in from the base metal. A total of up to 0.5% of these is permissible.

In the present invention, there are no particular restrictions on the weld base metal except that it be an austenitic steel which is thought to have sufficient resistance to hydrogen embrittlement. However, particularly in the case of a welded joint which is used in a high pressure hydrogen environment of at least 50 MPa of which excellent resistance to hydrogen embrittlement and low temperature toughness are demanded, in a preferred mode, such an austenitic stainless steel has a steel composition like the following.

C:

In austenitic stainless steel, $M_{23}C_6$-type carbides (M is Cr, Mo, Fe, or the like) and MC-type carbides (M is Ti, Nb, Ta, or the like) are often precipitated in order to increase corrosion resistance. However, in the present invention, precipitation of carbides is not mandatory. Rather, there are cases in which precipitation of carbides in grain boundaries has an adverse affect on toughness and the like, so C is preferably limited to at most 0.04%. More preferably it is at most 0.02%. The level of C is preferably as small as possible, but decreasing the C content to an extremely low level leads to an increase in refining costs, so from a practical standpoint, it is preferably at least 0.0001%.

Si:

Si is known as an element which is effective for improving corrosion resistance in a highly oxidizing environment, but if a large amount thereof is contained, it forms intermetallic compounds with Ni, Cr, and the like, it promotes the formation of intermetallic compounds such as sigma phase, and there are cases in which hot workability markedly decreases. Therefore, the content of Si is preferably made at most 1.0%. More preferably it is at most 0.5%. The less Si the better, but taking into consideration refining costs, it is more preferably at least 0.001%.

Mn:

Mn is an inexpensive austenite stabilizing element. In the present invention, when it is suitably combined with Cr, Ni, N, and the like, it contributes to high strength and an increase in ductility and toughness. Therefore, the Mn content is preferably at least 3%. However, if it exceeds 30%, there are cases in which hot workability and weathering resistance decrease, so a suitable content is 3-30%. A more preferred Mn content is 5-22%.

Cr:

Cr is important as an element which improves corrosion resistance in a high pressure hydrogen gas environment. Preferably its content is at least 15%. If its content becomes a large amount exceeding 30%, it easily forms a large amount of nitrides such as CrN and $Cr_2N$ and $M_{23}C_6$-type carbides which are harmful to ductility and toughness. Therefore, a suitable Cr content is 15-30%.

Ni:

Ni is added as an austenite stabilizing element, but in the present invention, when it is suitably combined with Cr, Mn, N, and the like, it contributes to obtaining a high strength and increasing ductility and toughness. For this purpose, the Ni content is preferably at least 5%. However, if it exceeds 30%, there is little increase in its effect and material costs increase, so in the present invention, the Ni content is 5-30%.

P, S:

P and S are each elements which have an adverse on the toughness of steel if contained in large amounts. Normally they are contained as impurities, and preferably they are at most 0.02% and at most 0.005%, respectively. More preferably P is at most 0.01% and S is at most 0.003%.

N:

N is the most important solid solution strengthening element. It contributes to a high strength when Mn, Cr, Ni, C, and the like are in a suitable range, and it suppresses formation of intermetallic compounds such as sigma phase and contributes to an improvement in toughness. In the present invention, its content is preferably at least 0.10%. However, if it exceeds 0.50%, formation of hexagonal system nitrides such as CrN and $Cr_2N$ is unavoidable, so a suitable content is 0.10-0.50%.

Al:

Al is effective as a deoxidizing agent, but in a base metal in which Ni is at most 30%, if a large amount of Al exceeding 0.10% remains, it promotes formation of intermetallic compounds such as sigma phase. From the standpoint of a deoxidizing effect, its content is preferably at least 0.001%.

Mo, W, V, Ti, Zr, Hf:

At least one of these elements is added. Each has the effect of promoting formation of cubic nitrides.

The contents thereof are preferably Mo: at most 10%, W: at most 10%, V: 0.001-1.0%, Ti: at most 0.01%, Zr: at most 0.01%, and Hf: at most 0.01%.

In particular, Mo and W are solid solution strengthening elements, so at least one of these is added. More preferably at least one of these is added in an amount of at most 6.0% each.

V contributes to a high strength and further improvement in ductility and toughness, and it greatly contributes to increasing resistance to hydrogen embrittlement. More preferably it is 0.05-1.0%.

As described above, Ti, Zr, and Hf have the effect of promoting formation of cubic nitrides. However, they impede the formation of vanadium nitrides, and the nitrides of these elements have poor coherency with the austenite matrix phase, so each is preferably limited to at most 0.01%.

The remainder of the steel composition of the weld base metal is Fe. The total of Cu, Co, and the like as unavoidable impurities is permitted to be up to 0.5%.

A weld metal according to the present invention is obtained as a result of mixing and melting a base metal and a welding material. It is sufficient for the steel composition thereof to satisfy the requirements of the present invention, and there are no other particular restrictions in the present invention on the steel composition of the weld base metal and the welding material used in welding.

In actuality, it is necessary to select the welding material in accordance with the composition of the base metal which is used. However, the dilution factor of the base metal, which is defined by the proportion of the base metal composition in the composition of the weld metal, is determined by the welding method. For example, it is around 5-30% with TIG or MIG welding, and it is around 40-60% with submerged arc welding.

In other words, in the present invention, after the steel composition of the weld metal is prescribed, the base metal can be easily determined taking into consideration the dilution factor determined by the welding method.

Accordingly, if the composition of the base metal is determined, the composition of the weld metal is calculated so as to be in the range of the present invention while maintaining the base metal dilution factor within an assumed range, and the composition of the weld material is selected.

There are no particular restrictions on a welding method used for a welded joint according to the present invention so long as the weld metal and the base metal for welding have the above-described steel compositions. Normally, however, as described above, TIG, MIG, or a shielded arc welding method (such as submerged arc welding) is used.

A weld metal which is obtained in this manner is given a high strength in the form of a tensile strength of at least 800 MPa by carrying out aging heat treatment at 550-700° C. for around 2-100 hours.

A welded joint according to the present invention can be used to form apparatuses and equipment for hydrogen gas stations and the like for fuel cell automobiles. For example, it can be used for assembly and installation of vessels, piping, valves, and the like for high pressure hydrogen, and its safety can be fully guaranteed. Of course, it can also be used for constituent elements (such as vessels, piping, and valves) of fuel cell automobiles.

Accordingly, the present invention can also be said to be equipment such as vessels, piping, and valves for high pressure hydrogen having the above-described welded joint.

Next, the operation and effects of the present invention will be explained more concretely based on examples.

EXAMPLES 50 kg of each of the base metals having the chemical compositions indicated by symbols M1-M4 in Table 1 were melted in a vacuum high frequency furnace, and then they underwent forging to obtain plates with a thickness of 25 mm. They were then subjected to heat treatment by holding for 1 hour at 1000° C. and water cooled to obtain test materials of a weld base metal.

50 kg of each of the alloys having the chemical compositions indicated by symbols W1-W5 and Y1-Y5 shown in Table 1 were melted in a vacuum high frequency furnace and worked to form wire with an outer diameter of 2 mm to be used as a welding material.

In order to evaluate the properties of welds, welded joints were prepared using the above-described weld base metals and welding materials under the below-described conditions, and tests evaluating the properties of the weld metals were carried out.

A plate measuring 25 mm thick, 100 mm wide, and 200 mm long with a 20° V-shaped bevel in one side of 200 mm long edge was prepared. It was combined with a plate having the same components to construct a material to be welded, which was then completely restrained to a steel plate measuring 50 mm thick, 150 mm wide, and 250 mm long by shielded metal arc welding (3 passes) around its entire periphery.

Using a material to be welded which was prepared in this manner, the welding materials shown in Table 1 were combined with base metals in the manner shown in Table 2, and multi-layer welding was performed by TIG welding inside the V-shaped groove of the material to be welded to prepare a welded joint. The welding conditions at this time were a welding current of 130 A, a welding voltage of 12 V, and a welding speed of 15 cm per minute.

An analysis of the steel composition of the resulting weld metal is shown in Table 2. This data was obtained from analysis of the region around the center zone of the weld metal.

After aging heat treatment at 650° C. for 2-10 hours, test pieces were machined from each of the resulting welded joints. A tensile test piece had a parallel portion with an outer diameter of 6 mm and a length of 30 mm. It was taken perpendicularly to the welding direction so as to have weld metal at the center of its parallel portion. A test piece for a tensile test in a hydrogen gas environment was carried out had a parallel portion with an outer diameter of 2.54 mm and a length of 30 mm. It was taken perpendicularly to the welding direction so as to have weld metal at the center of its parallel portion. A Charpy impact test piece measuring 10×10×55 mm and having a V-shaped notch with a depth of 2 mm at the center of the weld metal was taken perpendicularly to the welding direction.

Using these test pieces, a tensile test at room temperature and a Charpy impact test at 0° C. were carried out, and the strength and low temperature toughness of the welded joints were evaluated.

In addition, a tensile test in a hydrogen gas environment was carried out at room temperature in a high pressure hydrogen gas environment of 75 MPa at a strain rate of $10^{-4}$ per second.

The results are shown in Table 3. The evaluation was as follows. The weld metal of a welded joint according to the present invention was evaluated as good (○) when the tensile strength was at least 800 MPa, the Charpy absorbed energy indicating low temperature toughness at 0° C. was at least 20 J, and the ratio of the fracture ductility in a tensile test in a hydrogen gas environment to that in air which indicated resistance to hydrogen embrittlement was at least 0.8, and it was evaluated as X when any one of these was not satisfied.

The results are plotted in a graph in FIG. 1.

For joints A1-A7, for which the weld metal had a steel composition within the range of the steel composition of the present invention, the tensile strength was 800 MPa, the toughness was a Charpy absorbed energy of at least 20 J, the resistance to hydrogen embrittlement was a ratio of the fracture ductility in a hydrogen gas environment to that in air of at least 0.8, so even though it had a high strength, it exhibited excellent toughness and resistance to hydrogen embrittlement.

In the tensile test, the location of fracture in air was in the base metal. From this, it can be seen that the weld metal had a tensile strength above the breaking strength of the base metal. In contrast, the location was in weld metal in a hydrogen gas environment. The toughness was the value for the weld metal itself at the center of the test piece.

In contrast, in the cases falling outside the range of the present invention shown in FIG. 1, in the later stages of solidification which are the most important, separate solidification nuclei were formed from the liquid phase, and separate solid phases grew around the nuclei, so as a result, for symbols B1-B5 which did not satisfy the requirement (Ti and/or Al)>Nb/8 for dispersing the final solidified portion, excellent toughness and resistance to hydrogen embrittlement were not obtained at a high strength.

TABLE 1

|    | C     | Si   | Mn    | P     | S     | Ni    | Cr   | Mo   | W    | Ti   | Al   | Nb   | V    | N    |
|----|-------|------|-------|-------|-------|-------|------|------|------|------|------|------|------|------|
| Weld Base Material |||||||||||||||
| M1 | 0.024 | 0.32 | 10.2  | 0.017 | 0.001 | 8.75  | 18.3 | 2.32 | 0.12 | 0.01 | 0.01 | —    | 0.08 | 0.27 |
| M2 | 0.018 | 0.25 | 5.25  | 0.009 | 0.001 | 20.3  | 24.8 | —    | 0.23 | 0.01 | 3.2  | —    | 0.45 | —    |
| M3 | 0.022 | 0.32 | 0.88  | 0.017 | 0.001 | 10.4  | 17.5 | 2.21 | —    | 0.01 | 0.01 | —    | —    | 0.02 |
| M4 | 0.026 | 0.38 | 6.25  | 0.015 | 0.001 | 9.25  | 19.3 | 2.45 | —    | 0.03 | —    | —    | 0.06 | 0.26 |
| Welding Material |||||||||||||||
| W1 | 0.018 | 0.18 | 0.97  | 0.016 | 0.003 | 37.7  | 22.3 | 7.52 | —    | 0.23 | 0.93 | 3.87 | —    | 0.02 |
| W2 | 0.035 | 0.24 | 1.23  | 0.018 | 0.001 | 50.3  | 25.4 | 6.25 | —    | —    | 1.28 | 4.35 | —    | 0.02 |
| W3 | 0.025 | 0.19 | 0.57  | 0.011 | 0.002 | 71.2  | 21.7 | —    | —    | —    | 2.55 | 4.85 | —    | 0.03 |
| Y1 | 0.026 | 0.35 | 1.07  | 0.018 | 0.003 | 42.3  | 19.7 | 5.36 | —    | 0.12 | 0.11 | 4.38 | —    | 0.02 |
| Y2 | 0.022 | 0.28 | 0.98  | 0.019 | 0.003 | 51.2  | 26.5 | —    | —    | —    | 1.71 | 6.25 | —    | 0.02 |
| Y3 | 0.019 | 0.43 | 1.25  | 0.018 | 0.002 | 48.8  | 22.7 | —    | —    | 0.41 | 3.87 | 3.57 | —    | 0.03 |
| W4 | 0.018 | 0.21 | 1.05  | 0.017 | 0.003 | 38.9  | 22.8 | 7.71 | —    | 0.12 | 0.61 | 4.92 | —    | 0.02 |
| W5 | 0.026 | 0.45 | 0.96  | 0.015 | 0.001 | 40.2  | 21.5 | 7.71 | —    | 0.45 | —    | 3.51 | —    | 0.26 |
| Y4 | 0.021 | 0.18 | 0.97  | 0.016 | 0.003 | 37.7  | 22.3 | 7.52 | —    | —    | —    | 3.87 | —    | 0.02 |
| Y5 | 0.019 | 0.24 | 0.94  | 0.016 | 0.002 | 34.8  | 21.9 | 6.98 | —    | 0.25 | 0.68 | —    | —    | 0.02 |

TABLE 2

| | | | C | Si | Mn | P | S | Ni | Cr | Mo | W | Ti | Al | Nb | N | Al + Ti | Al + Ti − Nb/8 |
|---|---|---|---|---|---|---|---|---|---|---|---|---|---|---|---|---|---|
| | * | ** | | | | | | Weld Metal |||||||||||
| | | | | | | | | Present Invention |||||||||||
| A1 | M1 | W1 | 0.019 | 0.20 | 2.36 | 0.016 | 0.003 | 33.3 | 21.7 | 6.73 | 0.02 | 0.20 | 0.79 | 3.29 | 0.058 | 0.99 | 0.58 |
| A2 | M1 | W2 | 0.033 | 0.25 | 2.59 | 0.018 | 0.001 | 44.0 | 24.3 | 5.66 | 0.02 | —    | 1.09 | 3.69 | 0.058 | 1.09 | 0.62 |
| A3 | M1 | W3 | 0.025 | 0.21 | 2.03 | 0.012 | 0.002 | 61.8 | 21.2 | 0.35 | 0.02 | —    | 2.17 | 4.12 | 0.066 | 2.17 | 1.65 |
| A4 | M2 | W1 | 0.018 | 0.19 | 1.62 | 0.015 | 0.003 | 35.1 | 22.7 | 6.38 | 0.03 | 0.20 | 1.27 | 3.29 | 0.017 | 1.47 | 1.06 |
| A5 | M3 | W1 | 0.019 | 0.21 | 1.04 | 0.015 | 0.003 | 30.4 | 21.7 | 6.43 | —    | 0.19 | 0.81 | 3.39 | 0.058 | 1.00 | 0.58 |
| A6 | M1 | W4 | 0.019 | 0.23 | 2.36 | 0.017 | 0.003 | 34.6 | 22.2 | 6.94 | 0.02 | 0.10 | 0.52 | 4.22 | 0.056 | 0.63 | 0.10 |
| A7 | M4 | W5 | 0.026 | 0.44 | 1.75 | 0.015 | 0.001 | 35.6 | 21.2 | 6.93 | —    | 0.39 | —    | 2.98 | 0.260 | 0.39 | 0.01 |
| | | | | | | | | Comparative |||||||||||
| B1 | M1 | Y1 | 0.026 | 0.35 | 2.45 | 0.018 | 0.003 | 37.2 | 19.5 | 4.90 | 0.02 | 0.10 | 0.09 | 3.72 | 0.058 | 0.20 | −0.27 |
| B2 | M1 | Y2 | 0.022 | 0.29 | 2.37 | 0.019 | 0.003 | 44.8 | 25.3 | 0.35 | 0.02 | —    | 1.45 | 5.31 | 0.058 | 1.45 | 0.79 |
| B3 | M1 | Y3 | 0.020 | 0.41 | 2.60 | 0.018 | 0.002 | 42.7 | 22.0 | 0.35 | 0.02 | 0.35 | 3.29 | 3.03 | 0.066 | 3.64 | 3.26 |
| B4 | M1 | Y4 | 0.021 | 0.20 | 2.35 | 0.016 | 0.003 | 33.4 | 21.7 | 6.74 | 0.02 | —    | —    | 3.29 | 0.057 | —    | −0.40 |
| B5 | M1 | Y5 | 0.020 | 0.25 | 2.33 | 0.016 | 0.002 | 30.9 | 21.4 | 6.28 | 0.02 | 0.21 | 0.58 | —    | 0.057 | 0.79 | —    |

* Weld Base Material
** Welding Material

TABLE 3

| Weld Base Material | Welding Material | Tensile Strength of Joint | Toughness | Resistance to Hydrogen Embrittlement |
|---|---|---|---|---|
| Present Invention | | | | |
| A1 | M1 | W1 | ◯ | ◯ | ◯ |
| A2 | M1 | W2 | ◯ | ◯ | ◯ |
| A3 | M1 | W3 | ◯ | ◯ | ◯ |
| A4 | M2 | W1 | ◯ | ◯ | ◯ |
| A5 | M3 | W1 | ◯ | ◯ | ◯ |
| A6 | M1 | W4 | ◯ | ◯ | ◯ |
| A7 | M4 | W5 | ◯ | ◯ | ◯ |
| Comparative | | | | |
| B1 | M1 | Y1 | ◯ | X | X |
| B2 | M1 | Y2 | ◯ | X | X |
| B3 | M1 | Y3 | ◯ | X | X |
| B4 | M1 | Y4 | ◯ | X | X |
| B5 | M1 | Y5 | X | X | X |

INDUSTRIAL APPLICABILITY

The present invention makes it possible to provide a high-strength welded joint of an austenitic steel having low temperature toughness and resistance to hydrogen embrittlement which are particularly excellent in welds, these being properties demanded of piping, vessels, and the like for high pressure hydrogen. Accordingly, a welded joint according to the present invention is particularly useful in forming storage vessels, piping, valves, and the like for high pressure hydrogen in fuel cell automobiles or hydrogen gas stations, for example, so it can be seen that the present invention has great present-day significance.

The invention claimed is:

1. A welded joint of austenitic steel for use in a high pressure hydrogen gas environment comprising at least two base metal portions, each base metal being an austenitic steel, and a weld metal welded to the base metal portions to form a metal weld, characterized in that the metal weld comprises, in mass percent, C: at most 0.04%, Si: at most 1.0%, Mn: at most 3%, P: at most 0.02%, S: at most 0.005%, Cr: 15.0-25.0%, Ni: at least 30%, Mo: at most 10% and/or W: at most 10%, Nb: 2.5-5.0%, and at most 3.0% of Al and/or at most 0.5% Ti in amounts satisfying the following equation:

$$(Ti+Al) > Nb/8,$$

and a remainder of Fe and impurities.

2. A welded joint of austenitic steel for use in a high pressure hydrogen gas environment comprising at least two base metal portions of an austenitic steel and a weld metal welded to the base metal portions to form a metal weld, characterized in that the metal weld comprises, in mass percent, C: at most 0.04%, Si: at most 1.0%, Mn: at most 3%, P: at most 0.02%, S: at most 0.005%, Cr: 15.0-25.0%, Ni: at least 30%, Mo: at most 10% and/or W: at most 10%, Nb: 2.5-5.0%, and at most 3.0% of Al and/or at most 0.5% Ti in amounts satisfying the following equation:

$$(Ti+Al) > Nb/8,$$

and a remainder of Fe and impurities, and wherein the base metal of the austenitic steel comprises, in mass percent, C: at most 0.04%, Si: at most 1.0%, Mn: 3-30%, P: at most 0.02%, S: at most 0.005%, Cr: 15-30%, Ni: 5-30%, N: 0.10-0.50%, at least one of Mo: at most 10%, W: at most 10%, V: 0.001-1.0%, Al: at most 0.10%, Ti: at most 0.01%, Zr: at most 0.01%, and Hf: at most 0.01%, and a remainder of Fe and impurities.

3. A welded joint of austenitic steel at set forth in claim 1 for use in a high pressure hydrogen environment of at least 50 MPa.

4. A welded joint of austenitic steel as set forth in claim 1 forming a vessel, piping, or a valve for use in a high pressure hydrogen environment of at least 50 MPa.

5. A vessel for high pressure hydrogen having a welded joint of austenitic steel as set forth in claim 1.

6. Piping for high pressure hydrogen having a welded joint of austenitic steel as set forth in claim 1.

7. A welded joint of austenitic steel as set forth in claim 2 for use in a high pressure hydrogen environment of at least 50 MPa.

8. A welded joint of austenitic steel as set forth in claim 2 forming a vessel, piping, or a valve for use in a high pressure hydrogen environment of at least 50 MPa.

9. A vessel for high pressure hydrogen having a welded joint of austenitic steel as set forth in claim 2.

10. Piping for high pressure hydrogen having a welded joint of austenitic steel as set forth in claim 2.

* * * * *